United States Patent
Emerick

[15] 3,670,575

[45] June 20, 1972

[54] INDICATING DEVICE FOR CONTINUOUSLY INDICATING TIME TO DEPLETION OF PRESSURE TANKS IN USE

[72] Inventor: Bruce D. Emerick, 4927 Hauck Drive, New Orleans, La. 70127

[22] Filed: Feb. 19, 1971

[21] Appl. No.: 116,780

[52] U.S. Cl. ............................................73/388, 128/142.2
[51] Int. Cl. .......................................................G01l 13/00
[58] Field of Search..........................73/389, 388; 235/200 R; 128/142.2, 142.4; 137/63 R

[56] References Cited

UNITED STATES PATENTS 2,362,643  11/1944  Lambertsen..........................128/142.2

Primary Examiner—Donald O. Woodiel
Attorney—James B. Lake, Jr.

[57] ABSTRACT

An indicating device in which a pressure transducer periodically measures loss of pressure in a pressure tank to produce an output proportional to the logarithm of the pressure loss rate since the period is constant, and a second pressure transducer continuously measures the effective tank pressure, that is the pressure difference between the tank and the ambient pressures, in mechanical values which are converted into electric logarithmic signals by means of logarithmic potentiometers to drive a dial and pointer respectively in a slide rule application of subtracting exponents, that is logarithms, to divide the effective pressure in the tank by the rate of its use to read the time remaining to depletion from a logarithmic scale numbered arithmetically as indicated on the dial by the pointer.

10 Claims, 2 Drawing Figures

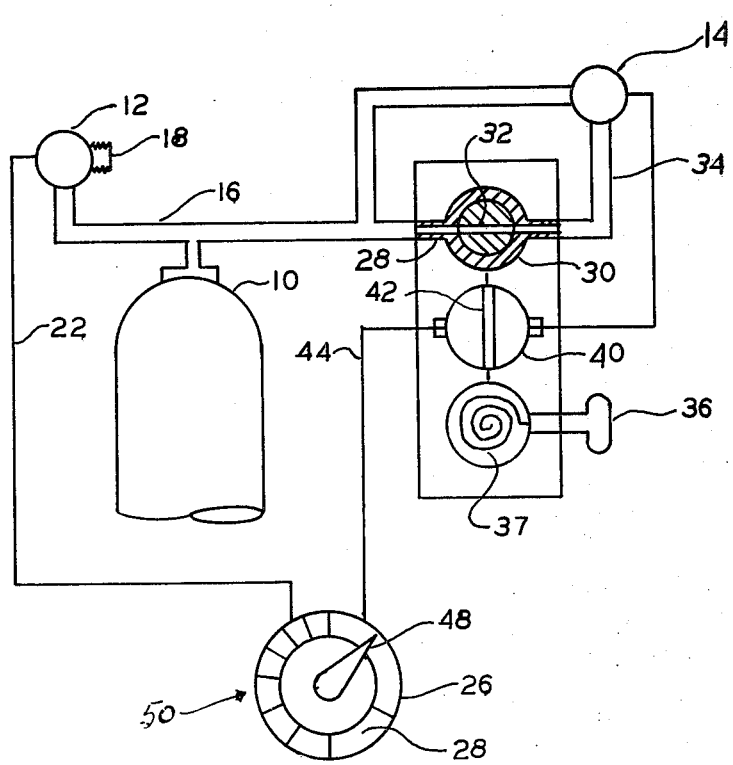
FIGURE I

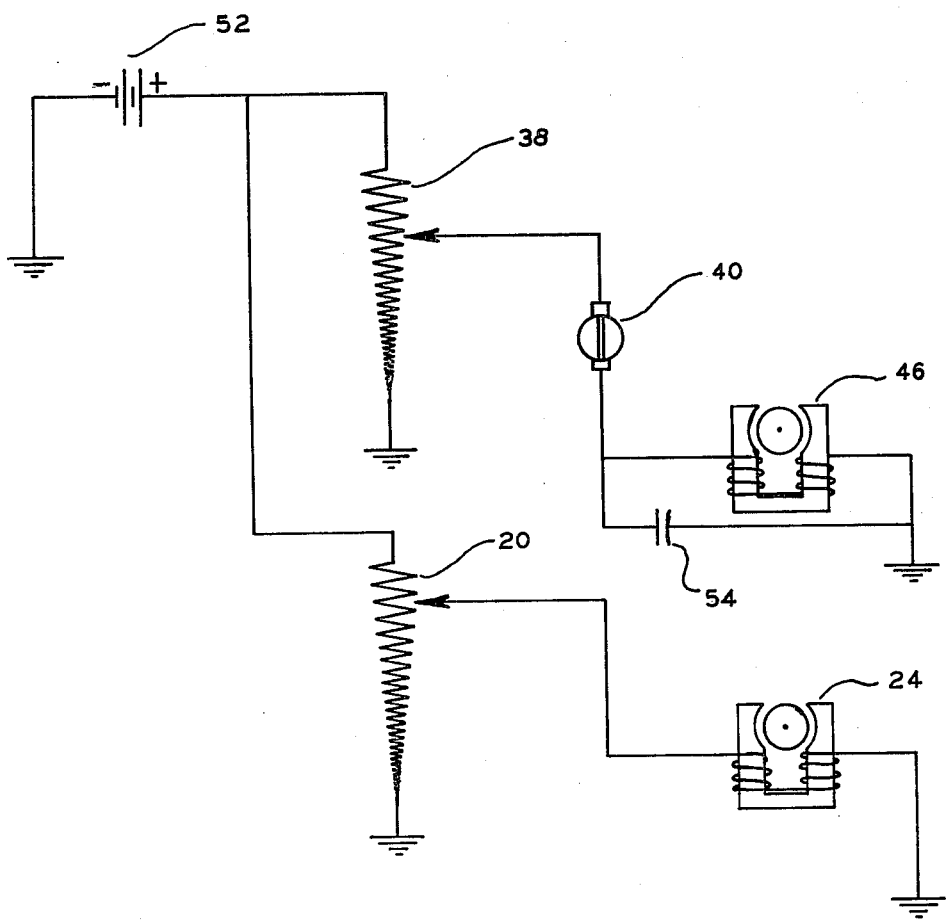
FIGURE II

[3,670,575]

INDICATING DEVICE FOR CONTINUOUSLY INDICATING TIME TO DEPLETION OF PRESSURE TANKS IN USE

The invention relates generally to indicating devices and more particularly to devices for indicating the mathematical results of a continuous division of variable values such as quantities by the rate of use of said quantities to arrive at a time of depletion of said quantities by slide rule techniques.

The invention will be described as used in SCUBA (self-contained underwater breathing apparatus) diving but is not restricted to that use.

Heretofore SCUBA divers could only read the pressure in their air supply tank and estimate how long it would last under variable conditions of depth of water the diver was in and the extent of physical activity in which he was engaged. The rate of use of the air in the tanks is varied by both of these variable conditions, and of course the rate of use determines the time the air supply in the tanks will last. This time is most important because a diver cannot safely rise to the surface from any depth of water as fast as he can do so, but must time his ascent in direct proportion to the depth of the water from which he started his ascent. Thus it is most important to a SCUBA or skin diver to know accurately the time his air supply will last, that is the time until the pressure in his air tank will fall to the minimum allowable safe limit.

It is an object of the invention to provide an indicating device that will read out the remaining time before the pressure in a pressure tank falls to an allowable minimum under variable rates of use or prevailing conditions of the environment.

Another object of the invention is to provide simple but effective computing and readout means for continuously dividing variable quantities by variable rates of use to automatically obtain continuous readouts of the time remaining for which the quantities will last.

Other objects and a more complete understanding of the invention may be had by referring to the following description, claims and drawings in which:

FIG. 1 is a diagrammatic sketch of the invention as operably connected together and to a pressure tank, and FIG. 2 is an electrical diagram of the electrical circuits in the invention.

Referring to FIG. 1 the parts of the invention is shown in combination with a SCUBA tank 10. These parts comprise two delta P transducers 12 and 14 connected by conduit 16 to tank 10 for the introduction of tank pressure into each of said transducers. It should be understood that delta P transducers compare two pressures each and measures the comparisons in electrical terms as electrical outputs. A bellows 18 is mounted on transducer 12 for the introduction of ambient water pressure therein. The mounting is made watertight to prevent water from entering the transducer 12. The continuous application of the pressures results in a continuous output in which the ambient water pressure is subtracted from the tank pressure. Since the air in the tank 10 cannot actually be used to zero tank pressure, transducer 12 should be biased to a safe minimum tank pressure.

The mechanical part of the transducer 12 operates a logarithmic potentiometer 20 (not shown but indicated in FIG. 2) which produces a logarithmic output that is electrically connected by cable 22 to energize meter driving mechanism 24 to rotate circular member 26. The member 26 is inscribed around its perimeter with a circular logarithmic scale 28 that is arithmetically numbered. Thus the member 26 is turned about its center axis by an amount equal to log( Pressure$_{tank\ as\ biased}$ - Pressure$_{amb}$).

Conduit 16, through which tank pressure is also introduced into transducer 14, has a branch conduit 28 intermediate tank 10 and transducer 14. A rotary valve 30 with a rotatable element 32 is connected to conduit 28 and to the transducer 14 by conduit 34. A clock mechanism 36 which is preferably driven by a spring 37, but can be electrically driven (circuit not shown) drives the rotatable element 32 to admit and lock in tank pressure through valve 30 and conduit 34 at regular intervals as determined by the speed of rotation of element 32. Thus transducer 14 continuously compares tank pressure maintained as at the beginning of each time interval as established by rotary valve 30 with decaying tank pressure as introduced through conduit 16 during the interval or period and gives a continuous electrical output of the comparison. This electrical output from a logarithmic potentiometer 38 is a logarithmic value as is the output of logarithmic potentiometer 20 (potentiometers not shown but indicated in FIG. 2).

A rotary switch 40, having a rotatable element 42, is also driven by clock mechanism 36 and connected to logarithmic potentiometer 38 for transmitting the logarithmic electrical signal only at the end of an interval through cable 44 to energize meter driving mechanism 46, similar to meter driving mechanism 24, to rotate a pointer 48, of an anti-log. indicator 50, said pointer being mounted concentrically with member 26 for rotation to subtract its signals therefrom. Thus pointer 48 is turned on the center axis of member 26 by an amount equal to log. (Pressure$_{tank\ at\ beginning\ of\ interval}$ - Pressure$_{at\ end\ of\ period}$ ÷ time interval). Both the pointer and the member move from a common index point to which they are biased when unenergized. By the mechanical subtraction of the logarithmic outputs in the anti-log. indicator 50, the division of the outputs are effected and the quotient time "$t$" to depletion can be read directly from the log scale arithmetically numbered on the circular member as indicated by the pointer.

Referring to FIG. 2 a wiring diagram illustrates the electrical circuits energized by a battery 52. A capacitor 54 may be connected across meter driving mechanism 46 to damp the periodic signals thereto.

The rotary switch 40 can be left out of FIGS. I and II. In this case there will be a continuous signal from the delta P transistor 14 to the meter driving mechanism 46. A diode should be connected in the electrical diagram of FIG. II in place of switch 40 to prevent the capacitor from reversing the signal flow during times of minimum signal strength.

Any valve that can be operated periodically can be substituted for rotary valve 30.

Any pressure transmitting device such as a diaphragm or a blatter can be substituted for the bellows 18.

What is claimed is:

1. An indicating device for automatically indicating the time to depletion of a pressure tank in use and comprising in combination: means continuously responsive to the pressure in said tank less the ambient pressure outside the tank and adapted to produce a continuous logarithmic output signal indicative of said difference; means responsive to the rate of depletion of pressure in said tank to produce logarithmic output signals indicative of said responses; receiving means responsive to the difference between the two foregoing means for continuously indicating the time to depletion of pressure in said tank; and battery means for energizing electrically the aforesaid means.

2. An indicating device as described in claim 1 wherein said continuously responsive means comprise: a pressure transducer having external pressure transmitting means for continuously measuring ambient pressure, said transducer operatively connected to said tank for continuously measuring the difference between the pressure in said tank and the ambient pressure as measured by said bellows means; and signal means mounted in said pressure transducer and logarithmically responsive to said difference in pressures for signalling the logarithmic value of said difference.

3. An indicating device as described in claim 1 wherein said means responsive to the rate of depletion of pressure in said tank comprises: a second pressure transducer operatively connected by two lines to said pressure tank for comparing and signalling the respective differences between pressures at the beginning and end of a plurality of respectively similar periods; a second signal means mounted in said second transducer and logarithmically responsive to the respective differences between said pressures at the beginning and end of each of said periods for signalling the logarithmic values of said respective differences; a periodically operable valve means placed in one said line between said pressure tank and said second transducer for admitting and locking in tank pressure to said transducer at the beginning of each period and releasing it at the end of each said period; timing means mounted adjacent said rotary valve for partial use in driving said valve at a uniform rate or rotation; a rotary switch connected to said second transducer and also driven by said timing means for receiving said logarithmical values of said respective differences at the ends of said periods and passing them to said receiving means and cutting off signals at all other times.

4. Means responsive to the rate of depletion as described in claim 3 wherein said rotary switch is replaced with a diode for continuously passing the logarithmic values of respective differences between pressures to said receiving means and preventing the reverse.

5. Means periodically responsive to the rate of depletion as described in claim 3 wherein said timing means is a spring driven clock mechanism.

6. Means periodically responsive to the rate of depletion as described in claim 3 wherein said timing means is an electrically driven clock mechanism.

7. An indicating device as described in claim 1 wherein said receiving means comprises: first meter driving means, having a center shaft mounted for turning, said shaft being driven by said logarithmic output signals indicating difference in tank and ambient pressures for registering an angular displacement proportional to said signal; a second similar meter driving means its center shaft being driven by the rate of depletion logarithmic output signals; and anti-log. indicating means driven by said respective shafts and adapted to take the difference between said logarithmic output signals to there by divide tank pressure less ambient pressure by the rate of tank pressure depletion and read out time to depletion of the tank.

8. Receiving means as described in claim 7 wherein said anti-log. indicating means comprises: a circular member having a logarithmic scale arithmetically numbered applied around its perimeter and mounted to turn around a center axis and adapted to be so driven by one said meter shaft; and a pointer member mounted to turn on said center axis and adapted to be so driven in the same direction as said circular member, whereby the angular displacement from a common index mark of said circular member and said pointer results in the pointer member indicating on the scale of the circular member the time to depletion of said tank.

9. Continuously responsive means as described in claim 2 wherein said pressure transmission means is a bellows.

10. Continuously responsive means as described in claim 2 wherein said periodically operable valve means is a rotary valve.

* * * * *